United States Patent

[11] 3,596,365

| [72] | Inventor | Cornelis M. Verhagen<br>Heemstede, Netherlands |
|---|---|---|
| [21] | Appl. No. | 853,140 |
| [22] | Filed | Aug. 26, 1969 |
| [45] | Patented | Aug. 3, 1971 |
| [73] | Assignee | Datawell N.V.<br>Haarlem, Netherlands |
| [32] | Priority | Aug. 27, 1968 |
| [33] | | Netherlands |
| [31] | | 6812205 |

[54] INCLINATION-MEASURING DEVICE
5 Claims, 5 Drawing Figs.

[52] U.S. Cl. .................................................. 33/216,
33/206 D, 33/206 DA, 33/215 C, 33/220 R
[51] Int. Cl. ............................................ G01c 15/10
[50] Field of Search .......................................... 33/206.5 L,
206.2 B, 215.1, 215.2, 215.3, 216, 217; 74/5.46

[56] References Cited

UNITED STATES PATENTS

| 2,375,227 | 5/1945 | Hillman ........................ | 33/206.5 UX |
| 2,564,018 | 8/1951 | Malmquist .................... | 33/206.5 X |
| 2,665,497 | 1/1954 | Bates ............................ | 33/206.5 |

FOREIGN PATENTS

| 75,287 | 1932 | Sweden ........................ | 33/215 (.3) |
| 583,425 | 1933 | Germany ...................... | 33/206 (.5) |

Primary Examiner—Leonard Forman
Assistant Examiner—Dennis A. Dearing
Attorney—Larson, Taylor & Hinds ABSTRACT: A device for measuring deviations from vertical comprising a spherical liquid-filled container with a pendulous coil supported by a thin thread conduct or from a fixed point on the interior of the sphere and having a density almost equally that of the liquid, and a pair of mutually perpendicular inductance coils concentrically mounted on the exterior of the sphere for monitering the magnitude and direction of the deviation from vertical of the pendulous member.

PATENTED AUG 3 1971

3,596,365

INVENTOR
CORNELIS M. VERHAGEN

BY Larson and Taylor

ATTORNEYS

INCLINATION-MEASURING DEVICE

The invention relates to a device for measuring deviations from the vertical. With the vertical in this specification is meant the local direction of gravity.

Such devices are widely known, varying from a simple plummet to complicated gyroscope systems.

An object of the invention is to provide a simple device, that indicates deviations from the vertical by means of electrical signals; is considerably cheaper than a gyroscope system and is in a high degree insensitive to disturbances originating from oscillations and horizontal accelerations, also if their oscillation period is relatively long, e.g. in the order of 15 to 20 seconds as occurs with ocean waves.

Consequently important applications of the invention are seen in measuring deviations from the vertical of ships, the sea surface and buoys.

Especially with respect to the latter the invention aims at providing a device, which consumes very little energy.

The above objects are attained according to the invention by providing an inwardly spherical-shaped vessel filled with liquid in which vessel to a suspension point nonmovable with respect to the inner surface of the vessel a thread is connected, supporting a winding support with an energizing winding, the line through the suspension point of the winding support and through the center of gravity of the winding support and the winding in the liquid coinciding with the winding axis, and in which two concentrical mutually perpendicular output windings are positioned independently on the energizing winding, the intersecting line of the main planes of the output coils, when vertical, coinciding with the axis of the energizing coil.

In order to minimize disturbances, which from the vessel wall are transmitted into the liquid in the vessel if the vessel wall rotates, it is important that the vessel wall is as smooth as possible and that there be present inside the vessel as little members as possible fixedly connected to the vessel. Accordingly it is provided according to a further elaboration of the invention, that the output windings are positioned outside the vessel, by reason of which the output windings cannot excite liquid currents, if the vessel oscillates rotatively.

A simple embodiment of the invention consists in that the output windings are fixedly connected to the vessel. They form then so to say mutual perpendicular rings around the vessel, that itself is connected to a construction of which the inclination with respect to the vertical has to be measured, e.g. a buoy on the sea surface or a constructional part of a ship.

Though it is possible to apply separate flexible connecting threads to the energizing winding, this is disadvantageous, because also very flexible thin threads have some stiffness. In order to obtain the longest possible oscillation period of the winding support with which especially the tilting oscillation movement should be considered, which is carried out by the support with respect to the point, where it is connected to the suspension thread, it is very important to minimize this stiffness as much as possible. Accordingly it is a further elaboration of the invention to provide in that the suspension thread contains one or more electrical conductors.

By reason of this the electrical conductors, which can be connected with the energizing winding, perform a double function of current feeding and suspension means. Further in this way the momentum which is exerted by the stiffness of the current conductors with respect to the point where the energizing winding support is connected to the thread, is kept very low, because the lever of this momentum is only the thickness of the suspension thread. When connecting an electrical conductor with an arbitrary point of the winding support, this latter should be many times if not hundreds of times greater.

In order to be able to do with only one electrical conductor the liquid can be electrically conducting and serving the purpose of connecting one terminal of the winding. In that instance AC current feeding of the winding, that is to say at least a feeding with alternating current direction, is desired, because direct current should induce polarization at the electrodes connecting the liquid in the feed circuit.

When applying the invention it is especially for obtaining long oscillation periods desired to choose the density of the liquid such, that it differs very little from the weight of the winding support and the winding divided by the volume of these parts. Adaptation of these quantities up to one of a few promilles, is desired. In that instance the suspension thread and the electrical conductor forming mainly this thread, can be chosen very thin.

In the following the invention is elucidated referring to the accompanying drawings, in which.

Figure 1:
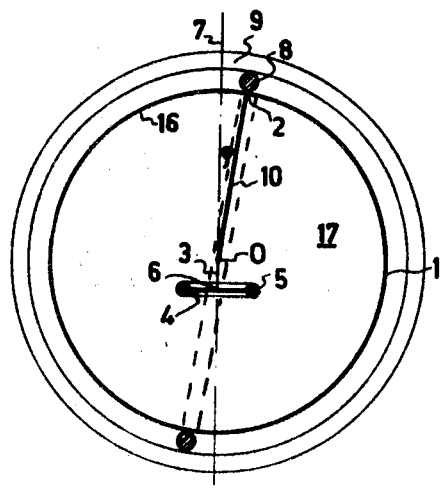
FIG. 1 shows a vertical cross section through a device according to the invention.
Figure 2:
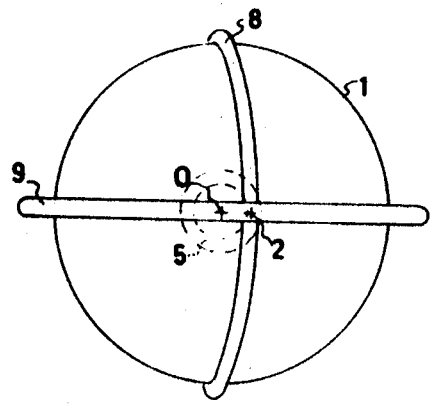
FIG. 2 shows a plane view of the device according to the invention.

In the drawing 1 indicates a spherical vessel in which in a point 2 a thin rigid bar 10 is attached, of which the end 0 coincides with the center of the sphere formed by the inner surface of the vessel 1. At the end 0 a suspension thread 3 is attached, supporting a winding support 4 and a winding 5. The winding support 4 forms together with the thread 3 a pendulum with respect to the suspension point 0, which has two degrees of freedom in two mutual perpendicular planes and further, because the thread 3 can twist a further degree of freedom. With respect to the suspension point 6 of the support 4 the latter can oscillate around two mutually perpendicular, horizontal axes intersecting in point 6. Decreasing these latter oscillations is especially of importance for securing that the winding 5 remains in a horizontal position. For this reason it is of importance that the weight of the winding support 4 together with that of the winding 5 is only very little greater than the weight of the liquid volume occupied by these parts. By reason of this a very small counteracting torque is induced if a position deviating from the horizontal position occurs. The inertia momentum of the winding support and the winding is not only dependent on their own masses, but is increased considerably because by movement of the winding support 4 and the winding 5 a considerable amount of liquid is entrained. If the winding support is thin it is possible that the weight of the entrained liquid is of the order of 200 times that of the winding support, so that the inertia momentum roughly spoken is increased by a factor 200. In this way it is possible to obtain oscillation periods in the order of 40 seconds and more. With such very long oscillation periods roll and heave, which e.g. are due to wave movements in sea, are hardly transmitted, so that the winding 5 very stably remains in a horizontal position with its axis 7 exactly vertical. At the outer side of the vessel 1 a coil 8 has been applied, which is concentrically to the vessel 1 and immediately outside it a second winding 9, which also is concentrical with the vessel 1 and perpendicular to the winding 8. These two windings are output windings. If the vessel 1 is in such a position, that the main planes of the windings 8 and 9 both are vertical, so that their intersecting line is vertical, too, the coupling with winding 5 is zero. A current variation fed to the winding 5 consequently does not induce a voltage in any of the windings 8 or 9. If, however, the vessel 1 is in a position deviating from the vertical, as indicated in FIG. 1, in which e.g. the winding 8 with its main plane includes an angle $\Phi$ with the vertical, whereas winding 9 still is in its vertical plane, a coupling between the winding 5 and the winding 8 is created, that is proportional to sin $\Phi$, in which $\Phi$ is the inclination angle of winding 8, as indicated in FIG. 1. Analogous considerations hold for winding 9 if it deviates from a vertical plane.

The inclination with respect to the vertical of the vessel 1 in a simple manner can be electrically determined from the output signals of winding 8 and 9 by vector adding of these output signals. If it is known which azimuth orientation have the windings 8 and 9, also the azimuth orientation of the inclination is known. This means e.g. that, if the vessel 1 is part of a buoy and this buoy is orientated in a determined manner with respect to the north-south direction, it is not only known, how great the inclination angle of the waves is, in which the buoy floats, but also the geographic orientation of the waves' inclination is known, and consequently the direction of propagation of the waves.

Figure 3:
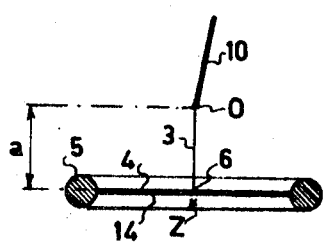
FIG. 3 shows a detail on an enlarged scale.

In FIG. 3 on an enlarged scale the suspended system 4 and 5 has been shown. Herewith the center of gravity of the complete system 4 and 5 is indicated with Z and the suspension point with 6. The distance from 6 to Z is proportional to the counteracting torque that is exerted by gravity when deviations from the horizontal position occur.

Figure 4B:
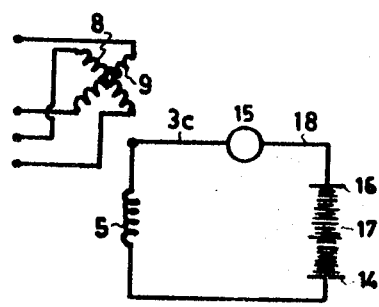
FIGS. 4a and 4b show two electrical schemes.
Figure 4A:
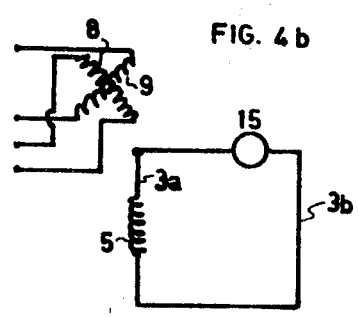

In FIGS. 4a and 4b two electrical circuits have been indicated.

According to FIG. 4a the winding 5 is connected to a current source 15 by means of two suspension threads 3a and 3b. With the embodiment according to FIG. 4b the current circuit is formed by the suspension thread 3c, winding 5, an electrode 14 mounted to the support 4, the liquid 17, an electrode 16 mounted to the inner wall of the vessel 1 and the conductor 18.

With the invention the measurement of deviations from the vertical in a high degree is not affected by rotational movements of the measuring device about a vertical axis.

The voltages induced in the windings 8 and 9 indicate the quantity and the direction of a deviation with respect to the vertical of the construction, to which the windings 8 and 9 have been mounted.

What I Claim is:

1. A device for measuring deviations from vertical which comprises an inwardly spherical vessel filled with a liquid, in which vessel a thread is connected to a suspension point that is not movable with respect to the inner surface of said vessel, a winding support supported by said thread, said winding support supporting an energizing winding, the line through the connecting point of the winding support and the center of gravity in the liquid of the combination of winding support and energizing winding coinciding with the axis of the energizing winding, two concentrically mutually perpendicular output windings fixedly mounted with respect to the energizing winding, the intersecting line of the main planes of the output windings in the position in which they are vertical, coinciding with the axis of the energizing winding.

2. Device according to claim 1, in which the output windings are positioned outside the vessel.

3. Device according to claim 2, in which the output windings are fixedly attached to the vessel.

4. Device according to claim 1, in which the suspension thread contains one or more electrical conductors.

5. Device according to claim 4, in which the suspension thread contains one electrical conductor and the liquid is electrically conducting.